May 8, 1934. G. W. BAUGHMAN Re. 19,156
ELECTRICAL CONTROLLING APPARATUS
Original Filed Jan. 29, 1925
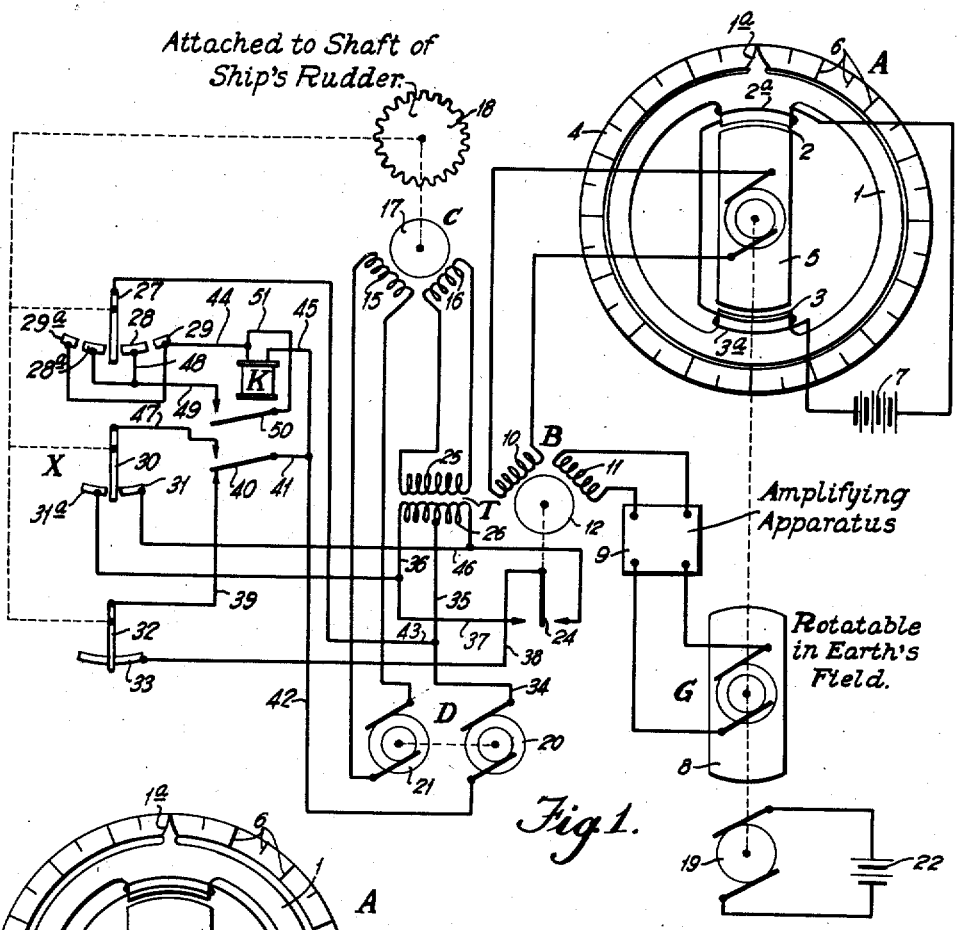
Fig. 1.
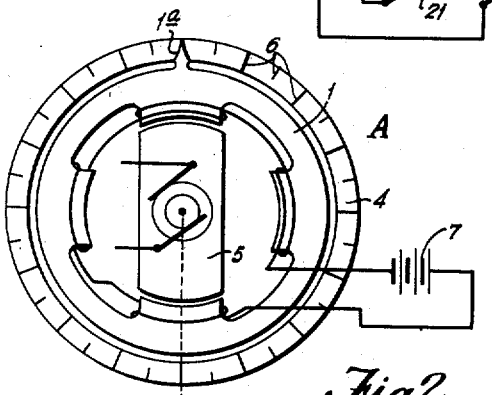
Fig. 2.
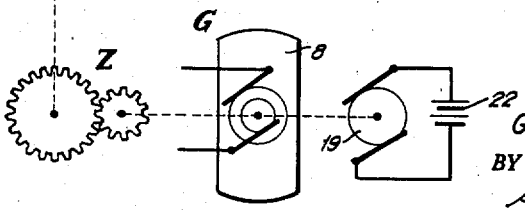
INVENTOR.
GEORGE W. BAUGHMAN.
BY Stephen Gerstick.
ATTORNEY.

Reissued May 8, 1934 Re. 19,156

UNITED STATES PATENT OFFICE 19,156

ELECTRICAL CONTROLLING APPARATUS

George W. Baughman, Pittsburgh, Pa., assignor to Pioneer Instrument Company, Incorporated, Brooklyn, N. Y., a corporation of New York Original No. 1,794,508, dated March 3, 1931, Serial No. 339,885, February 14, 1929, as a continuation of application Serial No. 5,641, January 29, 1925. Application for reissue June 7, 1932. Serial No. 615,938

9 Claims. (Cl. 172—282)

My invention relates to electrical controlling apparatus.

Apparatus embodying my invention is particularly adapted for, though in no way limited to, the control of apparatus for keeping a movable body on a predetermined course.

The present case is a continuation of my abandoned application Serial No. 5,641, filed January 29, 1925, for electrical controlling apparatus, in so far as the subject matter common to the two cases is concerned.

I will describe one form of apparatus embodying my invention, and one modification thereof, and will then point out the novel features thereof in claims.

In the accompanying drawing, Fig. 1 is a view, partly diagrammatic, showing one form of controlling apparatus embodying my invention as applied to the control of the steering mechanism of a ship. Fig. 2 is a view showing one modification of a portion of the controlling apparatus shown in Fig. 1.

Similar reference characters refer to similar parts in both views.

Referring first to Fig. 1, the controlling apparatus includes a controlling device A and an earth inductor G. The controlling device A comprises a cylindrical field structure 1, of magnetizable material provided with two inwardly projecting poles 2 and 3. These poles 2 and 3 are provided with windings 2*a* and 3*a*, respectively, which windings are connected in series and supplied with direct current from some suitable source such as a battery 7. The parts are so arranged that there is created between the poles 2 and 3, a unidirectional magnetic flux or field. For purposes of explanation I will assume that pole 2 is a south pole. The structure 1 is rotatable and is provided with a pointer 1*a* cooperating with a relatively fixed scale 4 carrying indicia 6 whereby the position of the structure 1 may be accurately observed. By rotating structure 1, then, the field between poles 2 and 3 may be adjusted to any angular position with respect to the scale 4.

An armature indicated diagrammatically by the reference character 5 is interposed between poles 2 and 3 and is therefore traversed by the flux created by windings 2*a* and 3*a*. This armature 5 is rotated by a motor 19 supplied with energy from some suitable source such as a battery 22. The alternating electromotive force thus created in armature 5 is applied to one winding 10 of a relay B. The other winding 11 is supplied with current from the alternator G. The magnetic field of the alternator G has a fixed direction in space. In the form here shown the alternator G is an earth inductor, that is, it comprises an armature 8 rotatable in the earth's field. The armature 8 is mechanically connected with armature 5 of alternator A and rotates in synchronism therewith. As shown in the drawing, amplifying apparatus 9 of some suitable form is interposed between the armature 8 and winding 11 of relay B.

The armatures 5 and 8 are preferably, though not necessarily, connected mechanically in such angular relation that when the field produced by windings 2*a* and 3*a* is parallel to the earth's magnetic field the currents induced in the armatures are in phase.

Rotor 12 of relay B controls a movable contact 24 arranged to occupy an intermediate position, a right-hand or a left-hand position depending upon the phase relation of the currents in windings 10 and 11.

The frequency and phase of the current supplied by alternator G are, of course, unvarying so long as the speed of rotation of armature 8 remains constant. But since armatures 5 and 8 rotate in synchronism, it will be plain that the apparatus may be used as a compass. For example, the scale 4 may be fixed on a ship. If, now, the field between poles 2 and 3 of member 1 be parallel with the earth's field, the currents in windings 10 and 11 of relay B will be in phase and the contact 24 controlled by rotor 12 of the relay will occupy an intermediate position. If, however, the field of structure 1 is displaced angularly with respect to the earth's field the current in winding 10 will lead or lag the current in winding 11, depending upon the direction of such displacement. When the current in winding 10 leads the current in winding 11, contact 24 is swung into its right-hand position, and when the current in winding 10 lags the current in winding 11, contact 24 is swung into its left-hand position. The relay B may be of any suitable type such as the two-element, three-position relay commonly used in telephone and signaling systems.

Since the contact of relay B assumes its intermediate position only when the fields of alternators A and G are parallel, if structure A be rotated till the relay contact does assume such intermediate position, pointer 1*a* will then indicate the direction of the earth's field.

Controlling apparatus embodying my invention is particularly suited for automatically controlling the course of a movable body such as a ship, aeroplane, etc. As shown in the drawing the apparatus is applied to a ship and controls the ship's rudder (not shown) through the medium of a gear 18 operatively connected with such rudder. This gear 18 is operatively connected with rotor 17 of reversible driving means here shown as a two-phase induction motor C, having one winding 15 constantly supplied with alternating current from one armature 21 of a two-phase generator D. Current of one polarity or the other is at times supplied from the remaining winding 20 of the generator D to the other winding 16 of motor C through a transformer T having its secondary 25 connected directly with winding 16. The supply of current to primary 26 of transformer T is controlled in part by relay B, and in part by a circuit controller designated by the reference character X, and operated in accordance with the position of the rudder.

The circuit controller X comprises three movable contact arms 27, 30 and 32 all operatively connected with the gear 18 and each cooperating with one or more fixed contacts. When the rudder occupies its middle position, contact 32—33 of circuit controller X is closed, but all the remaining contacts of the circuit controller are open. If the rudder is moved in one direction, however, contacts 27—28 and 30—31 close, and if this movement exceeds a predetermined amount, contact 32—33 opens and contact 27—29 closes. In similar manner a small movement of the rudder in the opposite direction away from its middle position closes contacts 30—31*a* and 27—28*a*, and a larger movement in this opposite direction opens contact 32—33, and closes contact 27—29*a*.

Associated with circuit controller X is a relay K which is at times supplied with current from winding 20 of generator D.

In explaining the operation of the apparatus, it should be stated that as shown in the drawing, the ship is assumed to be travelling in the direction indicated by the pointer 1*a*, so that the earth's magnetic field is in a direction parallel with the field produced by windings 2*a* and 3*a*. The currents in windings 10 and 11 of relay B are therefore in phase, and contact 24 occupies its intermediate position. The ship's rudder also occupies its middle position, so no current is being supplied to winding 16 of motor C, and the motor is at rest. All circuits for relay K are open, and this relay is therefore de-energized.

I will now assume that it is desired to change the course of the ship ten degrees to the right. Field structure 1 is rotated ten degrees to the left. Assuming, further, that armatures 8 and 5 are rotating in a counterclockwise direction, this movement of the field structure causes the current in winding 10 of relay B to lag the current in winding 11, and this phase displacement causes contact 24 of relay B to move to the left. Current then flows from one terminal of winding 20 of generator D, through wires 34 and 35, left-hand portion of primary 26 of transformer T, wires 36 and 37, contact 24 of relay B, wire 38, contact 32—33 of circuit controller X, wire 39, back contact 40 of relay K, and wires 41 and 42, back to the other terminal of winding 20. When this circuit is closed the current supplied to winding 16 of motor C operates the motor to move the rudder in such direction as to shift the ship's course toward the right. I will assume that this movement of the rudder swings the arms of the circuit controller X to the right, and contacts 30—31 and 27—28 close. The motion of the rudder continues, however, until contact 32—33 opens and contact 27—29 closes. The opening of contact 32—33 interrupts the circuit just traced, and the rudder comes to rest. The closing of contact 27—29 completes a pick-up circuit for relay K from winding 20, through wires 34 and 43, contact 27—29, wire 44, winding of relay K, and wires 45 and 42 back to winding 20. When relay K picks up, current flows from winding 20, through wires 34 and 35, a portion of primary 26 of transformer T, wire 46, contact 30—31 of circuit controller X, wire 47, front contact 40 of relay K, and wires 41 and 42 back to winding 20. The current now supplied to motor C drives the rudder back to its middle position. During this return movement contact 32—33 closes, but the circuit controlled by this contact is now open at back contact 40 of relay K. The pick-up circuit for relay K opens, as soon as the return movement of the rudder starts, but the relay is subsequently held closed by a stick circuit which passes from winding 20, through wires 34 and 43, contact 27—28 of circuit controller X, wires 48 and 49, front contact 50 of relay K, wire 51, winding of relay K, and wires 45 and 42 back to winding 20. When the rudder attains its middle position, contact 27—28 opens and breaks the stick circuit for relay K.

The movement of the rudder produced as described above swings the ship to the right, and if, when the relay K become de-energized, the ship has been moved to the course determined by the position of field structure 1, relay B will be de-energized, and the parts will remain in the position shown. If the turning of the ship, caused by the first movement of the rudder is not enough to bring the course of the ship into coincidence with the setting of the field structure, the cycle of operations described above is repeated until the proper course is established. If the ship turns off of its course in the opposite direction, the operation of the apparatus is similar to that described above except that the rudder will then be moved in the opposite direction to produce the required course correction.

It follows that any variation of the ship from a predetermined course will be automatically and instantaneously corrected by the steering apparatus.

It will be observed that the time during which the rudder remains in its deflected position, before return to the middle position depends upon the time required for the relay K to pick up. By constructing this relay with suitable time element characteristics, and by adjusting the stroke through which the rudder moves, by proper design of the circuit controller, the apparatus may be made to produce any reasonable amount of turning in one operation of the rudder. In practice it may be desirable to design the apparatus so that each operation of the rudder makes only a small correction in the course. In this case, a number of operations may be necessary to bring the ship on to a new course, but steering will be much more accurate.

By increasing the number of poles in the device A, I can increase the sensitivity of the apparatus. Referring for example to Fig. 2, I here show the field structure A provided with two pair of poles. In order that the frequencies of the current supplied by alternators A and G shall be the same, armature 5 is driven, through a 2 to 1 reduction gear Z, so as to rotate at one half the speed of armature 8. The two armatures are driven as before by motor 19. Relay B is controlled by circuits from armatures 5 and 8 as before. The operation of the device is the same as explained in connection with Fig. 1 but it should be particularly noted that with two pairs of poles, a variation in the course of the ship of one angular degree will produce a phase displacement of two electrical degrees between the currents in the winding of relay B. It therefore follows that for a given relay B, the sensitivity of the apparatus is increased by increasing the numbers of poles in the device A, because the minimum phase displacement required to operate the relay B will then be obtained for a smaller angular variation in the course of the ship.

For purposes of explanation I have here described my invention as applied to apparatus for steering of a ship in a horizontal plane but it should be pointed out that the invention is equally applicable to other movable bodies and to steering in other planes, as for the purpose of maintaining an aeroplane upon an even keel.

Although I have herein shown and described only one form of electrical controlling apparatus and one modification thereof embodying my invention, it is understood that various changes and modifications may be made therein within the scope of the appended claims without departing from the spirit and scope of my invention.

What I claim is:

1. Steering apparatus for a movable body comprising two alternators rotating in synchronism, means for varying the direction of the field of one of said alternators with respect to said body, and the field of the remaining alternator having a constant direction in space, and steering mechanism for said body responsive to the phase relation of the electromotive forces created by said alternators.

2. In combination, a movable body, a first alternator comprising a first armature rotatable in the earth's magnetic field, means for creating a unidirectional magnetic field in any selected direction with respect to said body, a second armature rotatable in such unidirectional field and connected mechanically with said first armature, said armatures thereby delivering alternating current having a phase relation depending upon the course of the body, and steering mechanism for said body responsive to the phase relation of such currents.

3. Steering apparatus for a movable body comprising means for creating two alternating currents having a phase relation which varies in accordance with the course of the body, a relay responsive to the phase relation of said currents, an induction motor having two windings, means for constantly supplying one winding of said motor with alternating current, means controlled by said relay for supplying the remaining winding of said motor with alternating current of one instantaneous relative polarity or the other and steering mechanism for said body controlled by said motor.

4. In combination, a movable body, a first armature rotatable in a magnetic field having a fixed direction in space, means for creating a second magnetic field, manually operable means for varying the direction of the second field in space, a second armature rotatable in the second field, and means responsive to the phase relation of the currents created in the two armatures for controlling the course of the body.

5. In combination, a movable body, a first armature rotatable in a magnetic field having a fixed direction in space, means for creating a second magnetic field, manually operable means for varying the direction of the second field in space, a second armature rotatable in the second field, and means responsive to the phase relation of the currents delivered by said two armatures to maintain said two fields in parallel relation by varying the course of the body.

6. Steering apparatus on a movable body comprising an alternator having a multipolar field and a first armature, means for varying the position of said field with respect to said body, a second armature rotatable in the earth's magnetic field and mechanically connected with first armature, and steering mechanism for said body responsive to the phase relation of the currents created in said two armatures.

7. Steering apparatus on a movable body comprising an alternator having a multipolar field and a first armature, means for varying the position of said field with respect to said body, a second armature rotatable in the earth's magnetic field and mechanically connected with said first armature whereby a comparatively small change in the relative positions of the earth's field and said multipolar field in space causes a comparatively large change in the phase relation of the currents created in said two armatures, and steering mechanism for said body responsive to such phase relation.

8. Steering apparatus on a movable body comprising an alternator having a multipolar field and a first armature, means for varying the position of said field with respect to said body, a second armature rotatable in the earth's magnetic field at such speed as to create an alternating current of the same frequency as that created by said alternator, said currents having a fixed phase relation for a given angular relation between said multipolar field and the earth's field, and steering mechanism for said body responsive to the phase relation of the currents created in such armatures.

9. An automatic steering device for seacraft and aircraft, comprising a device for producing an electromotive force from the horizontal component of the terrestrial magnetic field, a magnet fixed to the craft, a device for producing an electromotive force from the field of said magnet, means to combine said electromotive forces whereby to derive a resultant electromotive force which varies according to the yaw and direction of yaw of the craft, means operated by said resultant electromotive force to control the helm of the craft, and means to move said magnet in azimuth with respect to the craft whereby to vary the resultant electromotive force and thereby establish the direction of the heading to be automatically maintained by the steering device.

GEORGE W. BAUGHMAN.